United States Patent [19]
Perraud et al.

[11] Patent Number: 5,830,975
[45] Date of Patent: Nov. 3, 1998

[54] POLYAMIDE-BASED POWDER COMPOSITION FOR THE COATING OF METAL SUBSTRATES

[75] Inventors: Eric Perraud, Serquigny; Arnaud Tedoldi, Beaumont-le-Roger; Jean Marc Sage, Oullins, all of France

[73] Assignee: Elf Atochem S.A., Puteaux, France

[21] Appl. No.: 571,994

[22] PCT Filed: Jun. 30, 1994

[86] PCT No.: PCT/FR94/00804

§ 371 Date: May 31, 1996

§ 102(e) Date: May 31, 1996

[87] PCT Pub. No.: WO95/01403

PCT Pub. Date: Jan. 12, 1995

[30] Foreign Application Priority Data

Jun. 30, 1993 [FR] France ................................ 93 07976

[51] Int. Cl.$^6$ ........................... C08L 77/00; C08G 73/00
[52] U.S. Cl. ......................... 528/170; 528/310; 528/322; 528/332; 528/340; 525/600; 525/606; 524/420; 524/423; 524/434

[58] Field of Search ....................... 528/170, 310, 528/322, 332, 340; 524/600, 606; 525/423, 420, 434

[56] References Cited

U.S. PATENT DOCUMENTS

| 5,409,999 | 4/1995 | Merval et al. | 525/423 |
| 5,489,667 | 2/1996 | Knipf et al. | 528/292 |

FOREIGN PATENT DOCUMENTS

| 0 337 443 | 10/1989 | European Pat. Off. . |
| 0 412 888 | 2/1991 | European Pat. Off. . |
| 39 21 210 | 7/1990 | Germany . |
| 2-8230 | 1/1990 | Japan . |

*Primary Examiner*—P. Hampton-Hightower
*Attorney, Agent, or Firm*—Pennie & Edmonds LLP

[57] ABSTRACT

The invention relates to a mixture in powder form and comprising (i) at least one polyamide and (ii) at least one polymer (A) containing hydroxyl functional groups and compatible with the polyamide. The polymer (A) may be an ethylene/vinyl alcohol copolymer. The mixture may be used to coat metal substrates.

10 Claims, No Drawings

POLYAMIDE-BASED POWDER COMPOSITION FOR THE COATING OF METAL SUBSTRATES

TECHNICAL FIELD

The invention relates to a polyamide-based powder composition for coating metal substrates.

Polyamides are commonly employed for coating metal substrates, especially because of their good mechanical properties such as abrasion resistance, impact strength and their chemical inertness towards many products such as hydrocarbons, bases and inorganic acids.

It is known, however, that the adhesiveness of polyamides to metals is inadequate as a result of poor wettability of the polyamides in the molten state. To overcome this deficiency the metal support has been coated with an undercoat, called adhesion primer, intended to ensure the attachment and the mechanical bonding of the polyamide powder. In general the adhesion primer which is employed is based on heat-curable resins and is applied in powder form or in solution or in suspension in organic or aqueous solvents. Additional plant must therefore be provided for the contingent removal of the solvents and for baking the primer before the substrate thus clad is coated with the polyamide powder. In addition, the baking and/or drying of the primer result in a significant increase in the duration of the coating operations and hence their cost.

BACKGROUND ART

Mixtures or polyamides and of epoxy/sulphonamide resins which can be employed for coating metal substrates without employing an adhesion primer undercoat have been described in European Patent EP 0,412,288. These mixtures of polyamide and of epoxy/sulphonamide resins in powder form are applied with an electrostatic gun to the substrate. It then suffices to pass the substrate thus coated through an oven to obtain melting of the powder and a uniform coating. It is also possible to preheat the substrate above the melting point of the powder and to dip it in a fluidized bed of the powder.

DISCLOSURE OF THE INVENTION

Another polyamide-based powder composition has now been found which may be used for coating metal substrates without any adhesion primer, which exhibits very good resistance to saline mist. According to the present invention there is provided a mixture which takes the form of powder comprising at least one polyamide and at least one polymer (A) containing hydroxyl functional groups and compatible with the polyamide.

Polyamide within the meaning of the invention is intended to mean products of condensation of lactams, of amino acids or of diacids with diamines and, as a general rule, any polymer made up of units joined together by amide groups. Those advantageously employed are polyamide 11, which can be obtained by condensation of 11-aminododecanoic acid or of lactam 11 and polyamide 12, which can be obtained by condensation of 12-aminododecanoic acid or of lactam 12. It is also possible to employ polyamides 12–12.

Polyamide is also intended to mean polymers which have polyamide blocks in their chain. These are, for example, polyetheresteramides made up of polyamide blocks and of polyether blocks joined by ester functional groups. U.S. Pat. No. 4,230,838 describes a possible preparation of these products. The polymerization of a lactam is performed in the presence of a diacid to obtain a polyamide with carboxylic acid ends, and a polyether with hydroxyl ends is then added to it. The polyether is preferably polytetramethylene glycol, polypropylene glycol or polyethylene glycol. Other polymers which have polyamide blocks in their chain can be prepared according to U.S. Pat. No. 4,207,410. A lactam, a diacid and a polyether with hydroxyl ends are mixed in the presence of water and the temperature is maintained. A polymer is obtained which has polyamide blocks and polyether blocks mixed with diacid, all these components being joined by ester functional groups. It would not constitute a departure from the scope of the invention to employ a mixture of these polyamides.

The polymers (A) which have hydroxyl functional groups may be copolymers in which one of the monomers has at least one hydroxyl functional group, for example copolymers of ethylene and of vinyl alcohol (EVOH) or polymers which have been modified to introduce hydroxyl functional groups therein, for example polyacetates. The quantity of polymer (A) depends on the number of hydroxyl functional groups which it carries and on the properties which are sought after in the mixture. It is also not desirable to dilute the polyamide too much, or the coating qualities are lost. A proportion of 30 parts of polymers (A) per 100 parts of polyamide is an order of magnitude of the maximum. In general, quantities of 1 to 15 parts are sufficient to obtain a very good adhesiveness to the substrate.

The mixture of the invention is in powder form. This mixture may be a mixture of polyamide powder and of polymer (A) powder.

This mixture is deposited on the substrate and a homogeneous coating is obtained by melting. This coating therefore comprises a mixture of polyamide and of polymer (A).

"Compatible" is intended to mean that, in the coating, the polymer (A) is dispersed in the polyamide matrix.

The mixture of the invention can also be prepared by mixing the polyamide and the polymer (A) when molten and then reducing to powder. It is also possible to dissolve the polyamide and the polymer (A) in a solvent, to evaporate the solvent and then to reduce the mixture to powder. Regardless of whether melting or placing in a solvent are used, a mixture of polyamide and of polymer (A) in powder form is obtained.

"The polymer (A) which has hydroxyl functional groups and is compatible with the polyamide" means that in each grain of powder, the polymer (A) is dispersed in the polyamide matrix.

The melting point of the polymer (A) is advantageously close to that of the polyamides, that is to say generally between 130° and 190° C. The melt index (in g/10 min at 210° C., the load being 2160 g and the die 2.095 mm) of the polymer (A) is advantageously lower than 200 and preferably between 1 and 20.

By way of example of polymer (A) it is possible to employ EVOH copolymers of ethylene and of vinyl alcohol, of general formula:

—[—(CH$_2$—CH$_2$)$_x$—(CH$_2$—CHOH)$_y$—]$_n$—with 60% >x>20%

However, the best adhesiveness performance of the coating is obtained with molar ethylene contents of more than 40% in the copolymer.

The EVOH copolymer may include a comonomer of propylene, 1-butene or 1-pentene type, and whose molar content in the copolymer, generally lower than 5%, does not affect the properties of the latter. It is also possible to add epoxy/sulphonamide resins (B) to the mixture of polyamide and of polymer (A); such resins have already been described in European Patent EP 0,412,288. They can be obtained by reaction of sulphonamide compounds and of epoxy compounds. Epoxy resins are solid or liquid compounds which contain at least one epoxide functional group, by themselves or mixed.

The mixtures may consist of compounds which have a different number of epoxide functional groups and very frequently have an overall functionality (as epoxide) which is not complete. A very large number of examples of organic compounds corresponding to this definition, the structures of which vary very widely, are at present on the market and in the scientific and technical literature. The most commonplace compounds are those derived from the reaction of bisphenol A and of epichlorohydrin and, in particular, the compounds resulting from the addition of two molecules of epichlorohydrin to one molecule of bisphenol A (BADGE).

The epoxy resins preferred by the Applicant Company are those in which the overall functionality is between 1.9 and 2.1 and advantageously equal to 2.

The aromatic sulphonamide compounds may be chosen from halogenated or unhalogenated benzene monosulphonamide derivatives such as benzenesulphonamide, nitrobenzenesulphonamide, ortho—, meta— or para-toluenesulphonamide, aminoalkylbenzenesulphonamides and naphthalene- or xylenesulphonamide. The proportion of the epoxy and sulphonamide compounds must be such that the number of epoxy functional groups is equal to the number of sulphonamide functional groups. However, for reasons of reaction kinetics and/or of final product quality, it may be necessary to vary the stoichiometric ratio: (number of sulphonamide functional groups/number of epoxide functional groups) between 0.25 and 1 and preferably between 0.5 and 1.

The melting point of the epoxy/sulphonamide resins used in accordance with the invention is generally between 50 and 180° C. and their weight-average molecular mass Mw is generally between 500 and 10,000. The quantity of resins (B) may vary within wide proportions; generally not more than 20 parts of resins B are employed per 100 parts of polyamide, and preferably 1 to 7 parts.

Various other constituents may be incorporated into the mixture described above, such as fillers, pigments, additives such as antipitting agents, reducing agents, antioxidants etc.

By way of examples of fillers which may form part of the composition according to the invention there may be mentioned talc, calcium and manganese carbonates and potassium and aluminium silicates.

Titanium dioxide, zinc phosphate, lead silicochromate, carbon black and iron oxides may be mentioned as examples of pigments.

Various constituents may be incorporated into the mixture consisting of polyamide and of polymer A, these constituents being chosen from those described above and their respective proportions remaining within the limits usually encountered in the field of polyamide-based powder compositions for coating metal substrates. In general up to 100% by weight of the said constituents is incorporated, that is to say that these fillers may represent the same weight as the quantity of polyamide, of polymer (A) and optionally of epoxy/sulphonamide resin (B). The mixtures of the invention may be prepared by various processes.

A first process developed by the Applicant Company consists:
in dissolving the polymer (A) and optionally the resins (B) in a suitable solvent,
in then adding the polyamide powder to the solution thus obtained,
and finally in drying and screening the mixture to produce a powder composition of desired particle size.
All these stages can be carried out at ambient temperature.

A second process for obtaining a powder composition according to the invention consists in melt-blending the polymer (A) and optionally the resins (B) with the polyamide in a blender of suitable type. The blending temperature may be between 150° and 300° C. and preferably between 180° and 230° C. Depending on the content of polymer (A) and optionally of resins (B), a "master blend" or a final product is thus obtained.

The final product will be ground by the usual techniques, to the particle size sought after for the coating.

The master blend, which offers the advantage of providing good predispersion of the polymer (A) and optionally of the resins (B) within the polyamide matrix, can then be blended once again with the polyamide using the process referred to above or may be employed using the third process.

The third process developed by the Applicant Company consists in dry-mixing the polymer (A) and optionally the resins (B) or a master blend, finely preground, and the polyamide powder. This dry mixing or "dry blend" does not require any special equipment; it may be performed at ambient temperature. It is therefore economical and fast.

A fourth process for obtaining powder compositions according to the invention consists in performing a (co) polycondensation of the polyamide monomers in the presence of the polymer (A) and optionally of the resins (B). To this end the polymer (A) and optionally the resins (B) are introduced into the autoclave at the same time as the polyamide monomers. The polymerization is performed by the usual procedures. The operation is generally carried out at a temperature of between 150° and 300° C. and preferably between 190° and 250° C.

An alternative form of this process consists in carrying out a prior grafting of the polymer (A) onto a monofunctional acidic polyamide oligomer. One of the ends of the oligomer carries a carboxylic acid functional group.

Any type of apparatus employed for the polycondensation of polyamides may be used. To give an example, a reactor equipped with stirring at about 50 revolutions/min and capable of withstanding a pressure of 20 bars may be mentioned. The polycondensation period may be between 5 and 15 hours and preferably between 4 and 8 hours. When the polycondensation operations are finished, a mixture is obtained in the form of a granulate, which is ground to the desired particle size. In general, the particle size of the powders in accordance with the invention may be between 5 microns and 1 mm.

The present invention also relates to the use of the powder compositions as defined above for coating metal substrates and to the substrates thus coated. The metal substrate may be chosen from a wide range of products. It may be ordinary or galvanized steel articles or articles made of aluminium or aluminium alloy. The metal substrate may be of any thickness (for example of the order of a tenth of a mm, just as of the order of some tens of a cm).

According to a known technique, which in itself does not form a subject-matter of the invention, the metal substrate, and especially one made of ordinary steel, aluminium or aluminium alloy, may have undergone one or more of the following surface treatments, this list not constituting a limitation: coarse degreasing, alkaline degreasing, brushing, shot-blasting or sand-blasting, fine degreasing, hot rinsing, phosphating degreasing, iron/zinc/trication phosphating, chromating, cold rinsing, chromic rinsing.

By way of examples of metal substrates capable of being coated with a composition according to the invention, there may be mentioned: degreased, smooth steel or shot-blasted steel, phosphated degreased steel, iron or zinc phosphated steel, Sendzimir galvanized steel, zinc-electroplated steel, bath-galvanized steel, electrophoresis steel, chromated steel, anodized steel, carborundum-blasted steel, degreased aluminium, smooth or shot-blasted aluminium, chromated aluminium.

The polyamide-based composition according to the invention is therefore applied in powder form onto the metal substrate. The application of the powder composition may be performed according to the application techniques which are usually employed. Milling of the powders may be performed in equipment which is cooled cryogenically or with a high air intake (impeller, hammer, disc and similar mills). The powder particles obtained are classified in suitable equipment for removing the undesired particle size ranges: for example particles which are too coarse and/or too fine.

Electrostatic spraying and dipping in a fluidized bed may be mentioned among the techniques for applying powder, these techniques being preferred for carrying out the coating of the substrates according to the invention.

In electrostatic spraying the powder is introduced into a gun where it is conveyed by compressed air and flows into a nozzle raised to a high voltage, generally between some ten and some hundred kilovolts. The applied voltage may be of positive or negative polarity. The flow rate of the powder in the gun is generally between 10 and 200 g/min and preferably between 50 and 120 g/min. As it passes through the nozzle, the powder becomes charged electrostatically. The powder particles conveyed by the compressed air are applied onto the metal surface to be coated, the said surface itself being earthed, that is to say at a zero electrical voltage. The powder particles are retained on this surface by their electrostatic charge. These forces are sufficient for the powdered article to be capable of being coated and moved and then heated in an oven to a temperature which causes the powder to melt.

Electrostatic spraying of polyamide-based compositions according to the invention regardless of the polarity of application offers an undoubted advantage because it will be possible in particular to employ existing standard industrial plants which are designed for electrostatic spraying of powder coatings with only one polarity.

In electrostatic spraying the preferred weight ratio of the polymer (A) to the polyamide in the mixture is advantageously between 2 and 10%. In general, a powder of mean particle size between 5 and 100 microns and preferably between 5 and 65 microns can be employed.

The coatings produced with any one of the compositions according to the invention and applied by electrostatic spraying have a final appearance of good quality, this being regardless of the thickness of the said coating, of between 40 and 400 microns, as well as adhesiveness properties which are reinforced when compared with compositions comprising a polyamide and a resin B.

This is not the case with powder coatings based on polyamide alone without any adhesion primer, which exhibit many defects in appearance and adhesiveness at low or high thicknesses.

Low thicknesses are intended to mean thicknesses of approximately 50 microns and high thicknesses those of the order of 350 microns.

In low thicknesses a polyamide coating exhibits, for example, pitting; at high thicknesses there are considerable risks of delamination of the coating, of bubbles and of repulsion "molehills" appearing in a large number.

In the case of the fluidized bed dipping process the metal substrate to be coated, carefully prepared, for example by undergoing one or more of the surface treatments listed above, is heated in an oven to a temperature determined particularly according to the nature of the said substrate, its shape and the desired coating thickness. Thus heated, the substrate is then immersed in a powder composition according to the invention which is maintained in suspension by a gas circulating in a vessel with a porous bottom. The powder melts in contact with the hot metal surfaces and thus forms a deposit whose thickness is a function of the temperature of the substrate and of its period of immersion in the powder.

In fluidized bed dipping the preferred proportion of polymer A in relation to the weight of polyamide is advantageously between 1 and 10%. The particle size of the powders used in a fluidized bed may be between 10 and 1000 microns and, preferably, between 80 and 200 microns. In general, the coating thickness may be between 150 and 1000 microns and preferably between 200 and 700 microns.

WAYS OF CARRYING OUT THE INVENTION

The following examples illustrate the invention without, however, limiting it.

In the examples which follow, "MFI" denotes the melt index, expressed in g/10 min at 210° C. with a load of 2160 g and a die of 2.095 mm.

The inherent viscosity is measured in metacresol at 25° C. at a concentration of 0.5 g/100 g and is expressed in dl/g.

EXAMPLE 1

1—1 Preparation of the powder composition 500 g of EVOH with a molar ethylene content of 44% and MFI=12 are dissolved in a mixture of 2.5 kg of isopropanol (IPA) and 2.5 kg of water. This solution (1) is heated to 80° C. with stirring for 2 hours.

400 g of the solution (1) are then added to 1 kg of powdered polyamide 11 with an inherent viscosity of 0.9 and containing 13% by weight of various additives including 9.6% of filler, 1.8% of pigments and 4.6% of spreading agents, antioxidants, antipitting agents and reducing agents.

The mixture is stirred continuously for 4 min at ambient temperature. A paste is obtained which is dried in an oven for 6 hours in order to remove the water/isopropanol mixture. The dry residue is pulverized and screened through a 100-micron mesh screen in order to remove the coarse particles not corresponding to the particle size of the electrostatic powders.

1–2 Application

The composition obtained in 1—1 is deposited at ambient temperature by negative (a) or positive (b) 30 kV electrostatic spraying onto a steel panel of 1 mm thickness which has previously undergone a degreasing followed by a shot-blasting, the metal surface being at 0 voltage. Thus coated, the substrate passes through an oven maintained at 220° C. ±20° C., where it stays for 5 to 15 min and is then taken out of the oven and cooled in air.

1—3 Characteristics of the material

A) The material is a composite comprising in succession:
- a degreased and shot-blasted steel panel (1 mm thickness),
- a layer of powder composition as described under 1—1 of 100-micron thickness.

B) The material described in 1–3A undergoes the test for adhesiveness defined by NF standard T58-112. A score from 0 to 4 is given as a function of the adhesiveness obtained.

Class 4: the film cannot be parted from the metal;

Class 3: the film parts nonuniformly, the bonding is complete over at least 50% of the surface;

Class 2: the film parts nonuniformly, the force needed to tear it away is high and is at the strength limit of the coating;

Class 1: the film parts from the surface easily, the bond is weak;

Class 0: the coating exhibits no bonding to the surface.

C) The material described in 1–3A undergoes the test for corrosion behaviour in a saline mist defined by NF standard X41-002.

After aging for 1000 hours in saline mist, the change in adhesiveness according to NF standard T58-112 is observed. The adhesiveness results obtained for the material described in 1–3A) are shown in Table I.

EXAMPLE 2

The test of Example 1 is repeated by adding 400 g of the solution obtained in 1—1 to 1 kg of powdered polyamide 12 and copolyamide 6/12 with an inherent viscosity of 0.96 and containing 12% of various additives including 11.3% of fillers and pigments and 0.7% of antioxidant and reducing agents as well as 3% of epoxy/sulphonamide resin preground to a mean diameter of 10 microns. The epoxide compound is a resin derived from the reaction of bisphenol A and epichlorohydrin. The epoxy equivalent weight of this resin is 172 g and its hydroxyl content is 0.11 hydroxyl equivalent per kg of resin. The sulphonamide is para-toluenesulphonamide. A composite material is thus produced which comprises in succession:

a degreased and shot-blasted steel panel 1 mm in thickness;

a layer of polyamide 12, 6/12 120 microns in thickness.

The material described above undergoes a test for adhesiveness after aging in saline mist as defined in 1–3B and 1–3C. The results are listed in Table I.

EXAMPLE 3

3-1 Preparation of the powder composition 40 parts by weight of EVOH copolymer with characteristics identical with those of Example 1—1), preground cryogenically to a particle size of between 5 and 500 microns, are added to 1000 parts of PA 11 of inherent viscosity 0.90 and containing 13.8% of additives, including 11.3% of fillers and 3% of epoxy sulphonamide resin described in Example 2. The whole is blended and homogenized at a temperature of between 190° and 210° C. The residence time in the blending equipment is of the order of 30 s. Once cooled in the open air, the product obtained is ground in order to obtain a powder particle size of between 10 and 80 microns.

3-2 Application

The powder composition obtained under 3-1 is sprayed electrostatically onto a steel panel in the same conditions as those described in Example 1–2.

3—3 Characteristics of the material

A) The material is a composite comprising in succession:

a degreased and shot-blasted steel panel (1 mm thickness);

a layer of powder composition as described under 3-1 110 microns in thickness.

B) The material described in 3—3 A undergoes tests for adhesiveness and aging in saline mist as defined in Example 1–3B) and 1–3C). The results obtained for the material described in 3—3 A are listed in Table I.

EXAMPLE 4

The test of Example 3 is repeated using a mixture comprising:

40 parts by weight of EVOH copolymer with characteristics identical with those of Example 1—1, preground cryogenically to a particle size of between 5 and 150 microns, with 1000 parts of polyamide 12 of inherent viscosity 0.95.

The whole is blended and homogenized at a temperature of between 180° and 220° C. The residence time in the blending equipment is of the order of 30 s. Once cooled, the product obtained is ground cryogenically in order to obtain a powder particle size of between 10 and 80 microns.

30 parts by weight of epoxy/sulphonamide resin ground to a mean diameter of 10 microns (resin of Example 2) are added to 1000 parts of the product obtained, using simple dry mixing.

A composite material is thus obtained comprising in succession:

a degreased and shot-blasted steel panel 1 mm in thickness;

a layer of polyamide 12 100 microns in thickness.

The material thus described undergoes tests for adhesiveness after aging in saline mist as defined in 1–3C. The results are listed in Table I.

EXAMPLE 5

500 parts by weight of unground (granulate) EVOH copolymer are added to 500 parts by weight of unground (flake) polyamide 11 of inherent viscosity 0.95. The whole is blended and homogenized at a temperature of between 190° and 210° C. The residence time in the blending equipment is approximately 20 s.

Once cooled, 80 parts of this master mixture are added to 1000 parts of polyamide 11 of inherent viscosity 0.90 and containing 16.8% of additives, including 11.3% of fillers. The whole is blended and homogenized at a temperature of between 190° and 210° C. with a residence time in the blending equipment of approximately 30 s.

Once cooled, the product obtained is ground to a powder particle size of between 10 and 80 microns. Using the application described in 1–2, a composite material is produced, comprising in succession:

a degreased and shot-blasted steel panel 1 mm in thickness;

a layer of polyamide 11 100 microns in thickness.

The material thus described is subjected to the tests for adhesiveness and for corrosion behaviour in a saline mist, defined in 1–3B and 1–3C. The results are listed in Table I.

EXAMPLE 6

6-1 Preparation of the powder composition

Into a fast mixer of Henschel type 70 l in capacity are charged 20 kg of PA 11 powder, 1 kg of EVOH copolymer of composition described in 1—1, ground cryogenically and then classified so as to obtain a particle size smaller than 60 microns, and 0.6 kg of epoxy sulphonamide resin described in Example 2 and ground to a mean particle size of 10 microns. The PA 11 employed has an inherent viscosity of 0.90 and contains 13.8% of additives, including 11.3% of pigments and fillers and 2.5% of antioxidant and antipitting and reducing agents. The mixture is stirred for 100 s at a rate of 830 rev/min. The powder obtained can be used as it is.

6-2 Application

The powder composition obtained under 6-1 is sprayed electrostatically onto a steel panel in the same conditions as those described in Example 1–2.

6-3 Characteristics of the material

The material is a composite comprising in succession:
- a degreased and shot-blasted steel panel 1 mm in thickness;
- a layer of polyamide 11 100 microns in thickness.

The material thus described is subjected to the tests for adhesiveness and for corrosion behaviour in saline mist, defined in 1–3B and 1–3C. The results are listed in Table I.

EXAMPLE 7

Onto a degreased and shot-blasted steel panel is sprayed electrostatically, in the same conditions as those of Example 6-2, a composition consisting of 53% by weight of polyamide 12 and of 26% by weight of copolyamide 6/12, of various additives including 11.3% of pigments, fillers and 0.7% of antioxidant and reducing and spreading agents, 3% of epoxy sulphonamide resin described in Example 2 and of 5% of EVOH copolymer ground according to the characteristics given in Example 6. The inherent viscosity of the composition is evaluated at 0.96. A composite material is thus produced comprising in succession:
- a degreased and shot-blasted steel panel 1 mm in thickness;
- a layer of polyamide 12 and 6/12 100 microns in thickness.

The material described above is subjected to the tests for adhesiveness and for corrosion behaviour in saline mist, defined in 1–3B and 1–3C. The results are listed in Table I.

EXAMPLE 8: (not in accordance with the invention)

8-1) A powder with the same characteristics as those described in Example 6-1, with a mean particle size of 35 microns but containing no EVOH copolymer is sprayed electrostatically onto a degreased shot-blasted steel panel in the same conditions as those of Example 1–2.

8-2) The material obtained is a composite comprising successively:
- a degreased shot-blasted steel panel (1 mm thickness);
- a layer of PA 11 powder 110 microns in thickness.

8-3) The material described in 8-2 is subjected to a test for adhesiveness after aging in saline mist as defined in Example 1–3C. The results are combined in Table I.

EXAMPLE 9

The test of Example 3 is repeated in the same operating conditions, using grey-coloured PA 11 powder containing 16% by weight of additives, including 11.4% of pigments and fillers, 1.6% of antioxidant and antipitting and reducing agents and 3% of epoxy sulphonamide resin of Example 2.

The following compositions also contain 20 parts (9-2), 60 parts (9-3), 80 parts (9-4) and 100 parts (9-5) by weight respectively of EVOH copolymer per 1000 parts by weight of the PA 11 powder described above. The effect of the quantity of EVOH copolymer on the performance of the composite material after 1000 hours in saline mist (NF X41-002) can be assessed in Table II.

EXAMPLE 10

Polyamide powder as defined in the present document, with a mean particle size of between 20 and 300 microns, is placed in a dipping tank with a view to application as a fluidized bed. This powder is fluidized by entry of a gas on a porous slab installed at the bottom of the tank.

After surface treatment comprising a degreasing and shot-blasting, the metal substrate is preheated in a ventilated oven to a temperature of between 250°–400° C. The substrate is then immersed in the fluidized powder for a period of between 1 and 10 s in order to obtain a coating of thickness between 250 and 700 microns. Thus coated, the substrate is cooled to ambient temperature or else is quenched in cold water. Black-coloured PA 11 and PA 12 powders (sample A and B respectively) are employed, containing 0 or 100 parts by weight of EVOH copolymer per 1000 parts of polyamide.

The EVOH copolymer has a molar content of 44% of ethylene and an MFI of 12.

The adhesiveness of the coatings produced is measured after 24 hours in the ambient air using the test described in Example 1–3B, together with the adhesiveness according to the same test after 1000 h in saline mist (NF X41-002). The results obtained are combined in Tables III and IV.

TABLE I

| Example | Adhesiveness | Adhesiveness after 1000 hours saline mist | Preparation of the powder |
| --- | --- | --- | --- |
| 1 | 4 | 2 | Dissolving |
| 2 | 4 | 2 | Dissolving |
| 3 | 4 | 4 | Melt-blending |
| 4 | 4 | 4 | Melt-blending |
| 5 | 4 | 4 | Melt-blending starting with a master mixture |
| 6 | 4 | 4 | Dry mixing |
| 7 | 4 | 2 | Dry mixing |
| 8 | 4 | 1 | |

TABLE II

| Example | Adhesiveness | Adhesiveness after 1000 hours saline mist | % by weight of EVOH resin |
| --- | --- | --- | --- |
| 9-1 | 4 | 3 | 3 |
| 9-2 | 4 | 2 | 2 |
| 9-3 | 4 | 4 | 6 |
| 9-4 | 4 | 4 | 8 |
| 9-5 | 4 | 4 | 10 |

TABLE III

Example 10 A

| % by weight of EVOH resin | Adhesiveness | Adhesiveness after 1000 hours saline mist |
|---|---|---|
| 0 | 2 | 0 |
| 10 | 4 | 2 |

TABLE IV

Example 10 B

| % by weight of EVOH resin | Adhesiveness | Adhesiveness after 1000 hours saline mist |
|---|---|---|
| 0 | 2 | 0 |
| 10 | 4 | 1 |

We claim:

1. A composition in powder form and comprising (i) at least one polyamide and (ii) at least one polymer (A) containing hydroxyl functional groups and compatible with the polyamide, wherein the composition comprises no more than 30 parts of polymer (A) for 100 parts of polyamide, and wherein the polyamide is selected from the group consisting of PA-11 and PA-12.

2. A composition in powder form and comprising (i) at least one polyamide and (ii) at least one Polymer (A) containing hydroxyl functional groups and compatible with the polyamide, wherein the composition comprises no more than 30 parts of polymer (A) for 100 parts of polyamide which comprises a mixture of polyamide powder and of polymer (A) powder, the mixture on melting forming a dispersion of the polymer (A) in a matrix of the polyamide.

3. A composition in powder form and comprising (i) at least one polyamide and (ii) at least one polymer (A) containing hydroxyl functional groups and compatible with the polyamide, wherein the composition comprises no more than 30 parts of polymer (A) for 100 parts of polyamide comprising powder particles in which the polymer (A) is dispersed in the matrix of the polyamide.

4. The composition according to claims 1, 2 or 3, which further comprises an epoxy/sulphonamide resin (B).

5. An article comprising a metal substrate coated with a composition according to any of claims 1, 2, or 3.

6. An article comprising a metal substrate coated with at least one polyamide-containing layer resulting from the melting of a composition according to any of claims 1, 2 or 3.

7. A metal substrate coated with a composition according to any of claims 1, 2, or 3.

8. A dry blend in powder form and comprising (i) at least one polyamide selected from the group consisting of PA-11 and PA-12 and (ii) at least one polymer (A) containing hydroxyl functional groups and compatible with the polyamide, wherein the dry blend comprises no more than 30 parts of polymer (A) for 100 parts of polyamide.

9. The composition according to claim 1 wherein the composition, on melting, forms a dispersion of the polymer (A) in a matrix of the polyamide.

10. The composition according to claim 1 comprising powder particles in which the polymer (A) is dispersed in the matrix of the polyamide.

* * * * *